(12) United States Patent
Hung

(10) Patent No.: US 12,100,385 B2
(45) Date of Patent: Sep. 24, 2024

(54) SYSTEMS, METHODS AND INTERFACES FOR MULTILINGUAL PROCESSING

(71) Applicant: MICROSOFT TECHNOLOGY LICENSING, LLC, Redmond, WA (US)

(72) Inventor: David Peace Hung, Lynnwood, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 374 days.

(21) Appl. No.: 17/237,258

(22) Filed: Apr. 22, 2021

(65) Prior Publication Data
US 2022/0343893 A1   Oct. 27, 2022

(51) Int. Cl.
| G10L 15/00 | (2013.01) |
| G06F 40/58 | (2020.01) |
| G10L 15/26 | (2006.01) |
| G10L 15/32 | (2013.01) |

(52) U.S. Cl.
CPC ............ *G10L 15/005* (2013.01); *G06F 40/58* (2020.01); *G10L 15/26* (2013.01); *G10L 15/32* (2013.01)

(58) Field of Classification Search
None
See application file for complete search history.

(56) References Cited

U.S. PATENT DOCUMENTS

| 9,129,591 B2 | 9/2015 | Sung et al. |
| 9,589,564 B2 | 3/2017 | Sharifi |
| 10,147,428 B1 | 12/2018 | Shastry et al. |

(Continued)

FOREIGN PATENT DOCUMENTS

| CN | 106303695 A | 1/2017 |
| WO | 0101389 A2 | 1/2001 |

(Continued)

OTHER PUBLICATIONS

"International Search Report and Written Opinion Issued in PCT Application No. PCT/IB22/000451", Mailed Date: Dec. 5, 2022, 15 Pages. (MS# 409632-WO-PCT).

(Continued)

*Primary Examiner* — Shaun Roberts
(74) *Attorney, Agent, or Firm* — Workman Nydegger

(57) ABSTRACT

Systems are provided for multilingual speech data processing. A language identification module is configured to analyze spoken utterances in an audio stream and to detect at least one language corresponding to the spoken language utterances. The language identification module detects that a first language corresponds to the first portion of the audio stream. A first transcription of the first portion of the audio stream in the first language is generated and stored in a cache. A second transcription of a second portion of the audio stream in the first language is also generated and stored. When the second portion of the audio stream corresponds to a second language, a third transcription is generated in the second language using a second speech recognition engine configured to transcribe spoken language utterances in the second language. Then, the second transcription is replaced with the third transcription in the cache and any displayed instances.

17 Claims, 10 Drawing Sheets

(56) References Cited

U.S. PATENT DOCUMENTS

| | | | |
|---|---|---|---|
| 10,573,312 B1* | 2/2020 | Thomson | G10L 15/22 |
| 11,017,778 B1* | 5/2021 | Thomson | H04M 3/42382 |
| 2005/0091274 A1* | 4/2005 | Stanford | G06F 16/9577 |
| 2011/0246172 A1 | 10/2011 | Liberman et al. | |
| 2013/0238336 A1* | 9/2013 | Sung | G10L 15/32 |
| | | | 704/255 |
| 2015/0364129 A1* | 12/2015 | Gonzalez-Dominguez | |
| | | | G10L 15/005 |
| | | | 704/251 |
| 2018/0068661 A1* | 3/2018 | Printz | G10L 15/02 |
| 2019/0108834 A1* | 4/2019 | Nelson | G06N 5/04 |
| 2019/0318724 A1* | 10/2019 | Chao | G10L 15/02 |
| 2020/0098370 A1* | 3/2020 | Arar | G10L 15/26 |
| 2020/0160836 A1 | 5/2020 | Chen et al. | |
| 2020/0219492 A1* | 7/2020 | Apsingekar | G10L 15/22 |
| 2020/0311211 A1* | 10/2020 | Beck | G06F 40/58 |
| 2021/0110818 A1* | 4/2021 | Kim | G10L 15/187 |
| 2021/0400101 A1* | 12/2021 | Ingel | H04L 65/765 |
| 2022/0414349 A1* | 12/2022 | Rathnam | G06F 40/58 |

FOREIGN PATENT DOCUMENTS

| | | |
|---|---|---|
| WO | 2007045136 A1 | 4/2007 |
| WO | 2018093691 A1 | 5/2018 |
| WO | 2020117505 A1 | 6/2020 |

OTHER PUBLICATIONS

Alberti, et al., "Discriminative Features for Language Identification", In Proceedings of the Twelfth Annual Conference of the International Speech Communication Association, Aug. 27, 2011, 4 Pages.

* cited by examiner

| Time/Audio | T0 | T1 | T2 | T3 | T4 | T5 | T6 | T7 |
|---|---|---|---|---|---|---|---|---|
| SR (en-US) | | | | | | (from buffer) | | |
| SR (zh-CN) | | | (from buffer) | (from buffer) | | | | |
| LID | T0 | | T2 | | T2 | | T5 | |
| Raw Output | | T1 | | T3 | | | | |
| Final Output | T0 | T1 | T2 | | T2, T3, T4 | T5 | T5, T6 | T7 |

FIG. 4

SYSTEMS, METHODS AND INTERFACES FOR MULTILINGUAL PROCESSING

BACKGROUND

Speech recognitions systems are used to detect spoken language utterances and transcribe audio data into textual data, providing speech transcriptions for the corresponding audio data. Typically, speech recognition systems are most accurate when they have been trained for a single user and single environment (e.g., only in one language). However, for transcriptions of conversations, including conversations that include multi-lingual speakers, it is difficult to adapt the speech recognition systems to audio streams that alternate between different languages. This is a challenging task because current speech recognition engines typically support only one language domain, or applications must first specify the transcription language by specifying that a particular language should be automatically detected.

In view of the foregoing, there is an ongoing need for improved systems and methods for generating training data and training models, including the deployment of such models, for improved multilingual speech processing.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Systems are provided for generating, correcting and displaying multi-lingual speech transcriptions.

Disclosed systems are configured to obtain electronic content comprising an audio stream of spoken language utterances and to dynamically switch between different speech recognition engines used to perform transcriptions of the audio stream while performing real-time transcriptions.

Systems are provided for multilingual speech data processing. For instance, a language identification module is configured to analyze spoken utterances in an audio stream and to detect at least one language corresponding to the spoken language utterances. The language identification module detects that a first language corresponds to the first portion of the audio stream. A first transcription of the first portion of the audio stream in the first language is generated and stored in a cache. A second transcription of a second portion of the audio stream in the first language is also generated and stored. When the second portion of the audio stream corresponds to a second language, a third transcription is generated in the second language using a second speech recognition engine configured to transcribe spoken language utterances in the second language. Then, the second transcription is replaced with the third transcription in the cache and/or in displayed instances of the transcription.

In some instances, the disclosed systems use a language identification module associated with a plurality of speech recognition engines to analyze spoken language utterances and to detect at least one language within an audio stream of spoken language utterances. The systems use the language identification module to select a first speech recognition engine from a plurality of speech recognition engines corresponding to the detected language(s). The systems then use selected/first speech recognition engine to generate a first transcription of a first portion of the audio stream in the first language, which is stored in a transcription cache. A second transcription is also generated for a second portion of the audio stream in the first language using the first speech recognition engine. This second transcription is also stored in the transcription cache.

Subsequent to and/or concurrently to the second transcription being generated, the language identification module is used to determine that the second portion of the audio stream corresponds to a second language. Thereafter, it is also subsequently determined by the system that the second portion of the audio stream corresponds to a second language. Then, the system generates a third transcription in the second language using a second speech recognition engine that is identified by the language identification module and that is configured to transcribe spoken language utterances in the second language. Then, the second transcription is replaced by the system(s) with the third transcription within the transcription cache, and such that the resulting stored transcriptions of the audio stream correspond more closely match the appropriate/identified languages spoken in the audio stream, having been transcribed by speech recognition engines specifically configured to transcribe the different portions of the audio stream in the different identified languages, respectively.

Some disclosed systems and methods are also configured to obtain electronic content comprising an audio stream of spoken language utterances and to dynamically generate, correct and render real-time transcriptions of the audio stream in real-time at one or more interfaces. The systems are configured, for instance, to dynamically generate and display a first real-time transcription of the audio stream in a first language at one or more interfaces, while identifying a sub-portion of the first real-time transcription that comprises one or more incorrectly transcribed spoken language utterances. The systems are also configured to subsequently generate and render a corrected transcription of the sub-portion that was previously transcribed/rendered, by replacing one or more incorrectly transcribed spoken language utterances with corrected transcriptions of the audio stream within the displayed interface(s).

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 4 illustrates an example embodiment for removing the processing latency to generate transcriptions in real-time.

DETAILED DESCRIPTION

Disclosed embodiments are directed towards systems and methods for multilingual speech processing. In some embodiments, the present invention is directed to systems and methods for generating and correcting multi-lingual speech transcriptions. The present invention provides many advantages over existing systems. For instance, methods are provided for generating, correcting, and dynamically displaying multi-lingual speech transcriptions in real-time.

Figure 1:
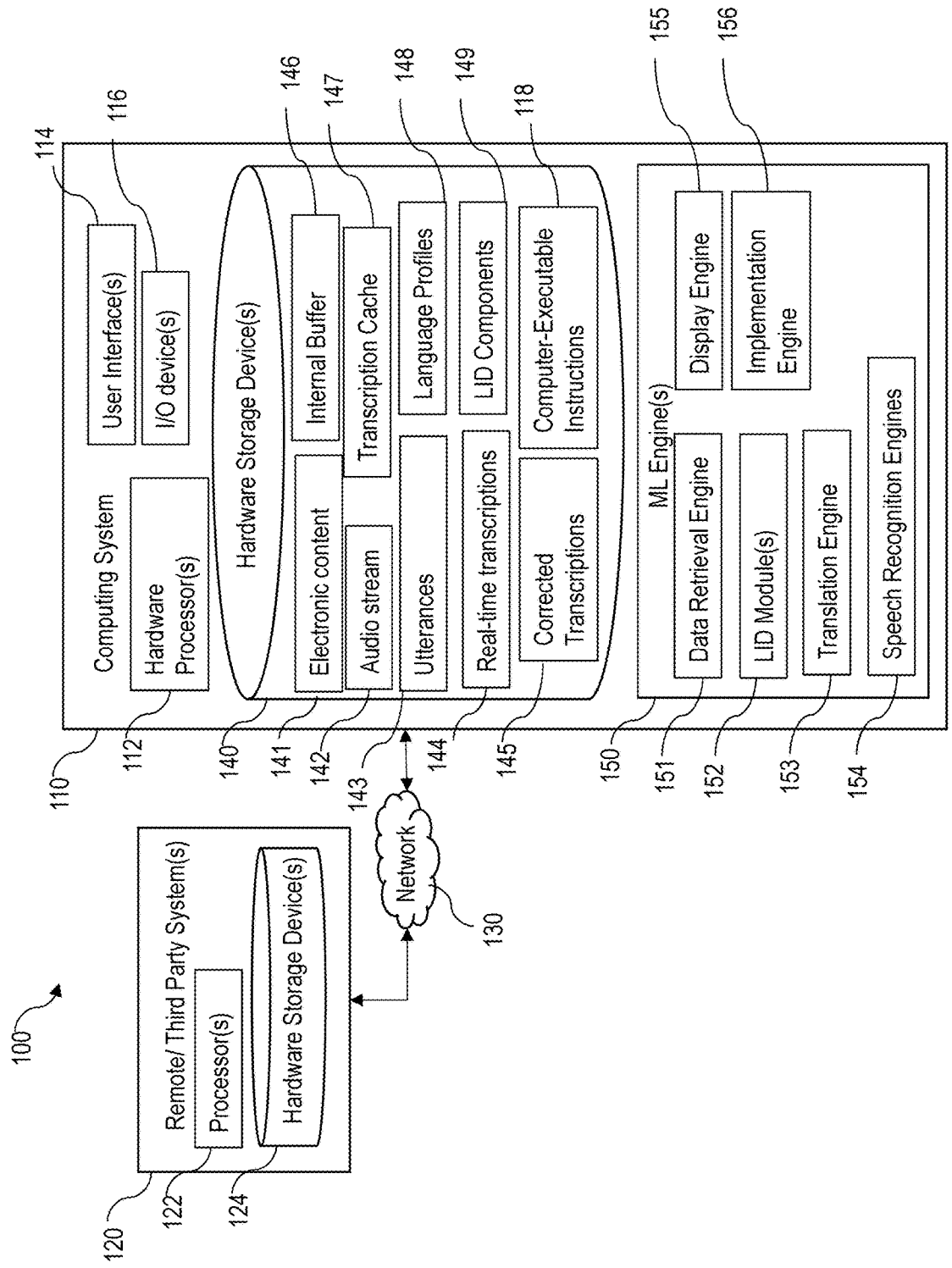
FIG. 1 illustrates a computing environment in which a computing system incorporates and/or is utilized to perform disclosed aspects of the disclosed embodiments.

Attention will now be directed to FIG. 1, which illustrates components of a computing system 110 which may include and/or be used to implement aspects of the disclosed invention. In some instances, components of FIG. 1 will be described in conjunction with components of FIG. 2, which illustrates an exemplary process flow diagram for generating speech transcriptions using one or more components as shown in FIG. 1. As shown in FIG. 1, the computing system includes a plurality of machine learning (ML) engines, models, modules, neural networks and data types associated with inputs and outputs of the machine learning engines and models.

The computing system 110 is part of a computing environment 100 that also includes remote system(s) 120 in communication (via a network 130) with the computing system 110. The computing system 110 is configured to analyze audio streams, detect one or more languages, and transcribe spoken language utterances into multilingual transcriptions. The computing system 110 is also configured to dynamically display the multilingual transcriptions in or near real-time.

The computing system 110, for example, includes one or more processor(s) 112 (such as one or more hardware processor(s)) and a storage (i.e., hardware storage device(s) 140) storing computer-executable instructions 118 wherein one or more of the hardware storage device(s) 140 is able to house any number of data types and any number of computer-executable instructions 118 by which the computing system 110 is configured to implement one or more aspects of the disclosed embodiments when the computer-executable instructions 118 are executed by the one or more processor(s) 112. The computing system 110 is also shown including user interface(s) 114 and input/output (I/O) device (s) 116. The computing system 110 is configured to modify the user interfaces(s) 114 to display multi-lingual speech transcriptions (e.g., real-time transcriptions 144), corrected transcriptions 145, and multi-lingual speech translation transcriptions.

As shown in FIG. 1, hardware storage device(s) 140 may be configured as a single storage unit. However, it will also be appreciated that the hardware storage device(s) 140 are configurable to be distributed among several separate and sometimes remote system(s) 120. In this regard, the computing system 110 may also be viewed as a distributed system, in which all of the illustrated components in the computing system 110 may be distributed among and maintained/run by different discrete systems that are remote from each other. In some instances, a plurality of distributed systems performs similar and/or shared tasks for implementing the disclosed functionality, such as in a distributed cloud environment.

The hardware storage device(s) 140 are configured to store the different data types including electronic content 141, audio streams 142, spoken language utterances (e.g., utterances 143), real-time transcriptions 144, corrected transcriptions 145, language profiles 148, and language identification module components (e.g., LID components 149) described herein.

The storage (e.g., hardware storage device(s) 140) includes computer-executable instructions 118 for instantiating or executing one or more of the models and/or engines shown in computing system 110. The models are configured as machine learning models or machine learned models, such as deep learning models and/or algorithms and/or neural networks. In some instances, the one or more models are configured as engines or processing systems (e.g., computing systems integrated within computing system 110), wherein each engine (i.e., model) comprises one or more processors (e.g., hardware processor(s) 112) and computer-executable instructions 118 corresponding to the computing system 110.

The storage device 140 also store storing machine learning (ML) Engine(s) 150, although they are presently shown in a separate box. They are shown separately, to illustrate how they may be isolated from other stored components and/or accessed from remote and separate systems.

The stored ML Engine(s) 150 include one or more of the following: data retrieval engine 151, LID module(s) 152, translation engine 153, speech recognition engines 154, display engine 155, and implementation engine 158 which are individually and/or collectively configured to implement the different functionality described herein.

For example, the data retrieval engine 151 is configured to locate and access data sources, databases, and/or storage devices comprising one or more data types from which the data retrieval engine 151 can extract sets or subsets of data to be used as for generating speech transcriptions. The data retrieval engine 151 receives data from the databases and/or hardware storage devices, wherein the data retrieval engine 151 is configured to reformat or otherwise augment the received data to be used as training data. Additionally, or alternatively, the data retrieval engine 151 is in communication with one or more remote systems (e.g., remote system(s) 120) comprising remote datasets and/or data sources. In some instances, these data sources comprise visual services that record or stream text, images, and/or video.

The data retrieval engine 151 accesses electronic content 140 comprising one or more types of audio-visual data including video data, image data, holographic data, 3-D image data, etc., wherein the data retrieval engine 151 is able to extract or retrieve audio streams 142 from the electronic content 141. The audio streams 142 comprise one or more spoken language utterances (e.g., utterances 143). Each spoken language utterance comprises one or more words and/or one or more phrases that are spoken in one or more languages. The audio stream 142 comprises one or more speakers and one or more languages associated with each of the one or more speakers. The data retrieval engine 151 is a smart engine that is able to learn optimal dataset extraction processes to provide a sufficient amount of data in a timely manner as well as retrieve data that is most applicable to the desired applications for which the machine learning models/engines will be trained and/or implemented.

The data retrieval engine 151 locates, selects, and/or stores raw recorded source data wherein the data retrieval engine 151 is in communication with one or more other ML engine(s) and/or models included in computing system 110. In such instances, the other engines in communication with the data retrieval engine 151 are able to receive data that has been retrieved (i.e., extracted, pulled, etc.) from one or more data sources such that the received data is further augmented and/or applied to downstream processes.

For example, the data retrieval engine 151 is in communication with the LID module(s) 152, the internal buffer 146, the translation engine 153, the speech recognition engine(s) 154, the display engine 144, and/or implementation engine 156. The data retrieval engine 151 is also configured to retrieve one or more portions of the audio stream 142 stored in the internal buffer 146 to transmit/route to one or more speech recognition engines 154, and/or retrieve one or more real-time transcriptions 144 in the transcription cache to transmit/route to the display engine 155 to display on the user interface(s) 144.

The one or more language identification modules (e.g., LID module(s) 152) is/are configured to receive utterances 143 from audio stream 142 and detect one or more languages (e.g., associated with language profiles 148) corresponding to the utterances 143. The LID module(s) 152 are also configured to detect whether a new spoken language utterance corresponds to the same language as a previous spoken language utterance or corresponds to a new language. If a new language is detected, the LID module(s) 152 send an alert message to a controller 202 (see FIG. 2) to switch to a new speech recognition engine 154 that corresponds to the new language and signals the controller 202 to retrieve one or more portions of the audio stream 142 stored in the internal buffer 146 to transmit these portions of the audio stream to the new speech recognition engine 154.

The translation engine 153 are configured to translate and then transcribe spoken language utterances of the audio stream in one language into one or more different languages. The speech recognition engines 154 are specifically trained on specific ground truth from corresponding languages to detect speech (e.g., utterances 143) and generate transcriptions (e.g., real-time transcriptions 144 and/or corrected transcriptions 145) of the detected speech utterances in the corresponding languages from an audio stream.

Figure 2:
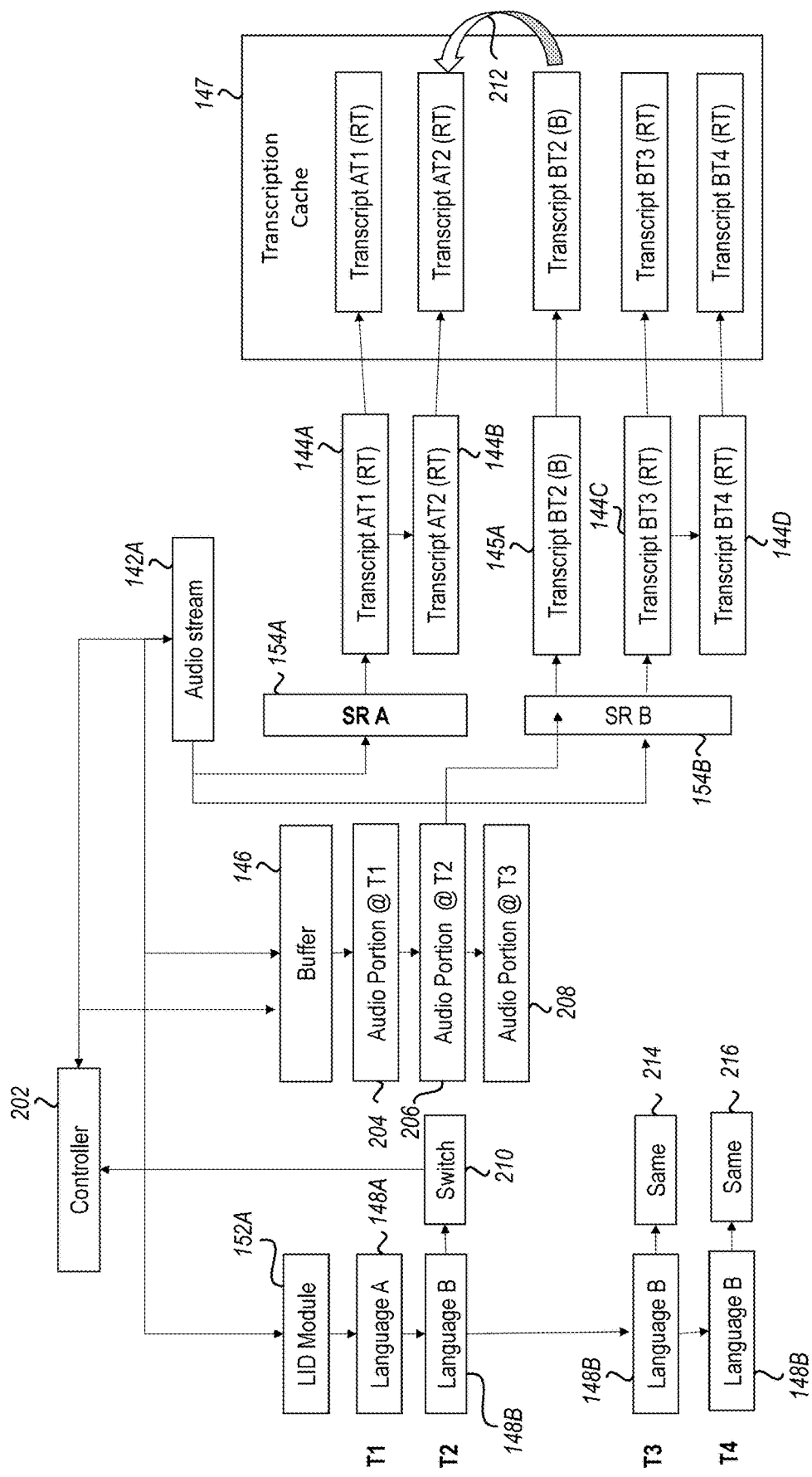
FIG. 2 illustrates an example embodiment for generating and correcting multi-lingual speech transcriptions.

The internal buffer 146 is configured to store one or more portions (e.g., audio portion 204, audio portion 206, and/or audio portion 208; see FIG. 2) of the audio stream 142 such that when a real-time transcription 144 needs a corrected transcription 145, the data retrieval engine 150 retrieves the one or more portions of the audio stream 142 stored in the internal buffer 146 and transmits the one or more portions of the audio stream to the new speech recognition engine 154 selected to generate the corrected transcription 145.

The display engine 155 is configured to modify and update one or more user interface(s) 114 to display real-time transcriptions 144 and corrected transcriptions 145 at various locations within the designated user interface(s). The display engine 155 is also configured to display translated versions of the transcriptions.

In some embodiments, the computing system 110 includes an implementation engine 156 in communication with any one of the models and/or ML engine(s) 150 (or all of the models/engines) included in the computing system 110 such that the implementation engine 156 is configured to implement, initiate or run one or more functions of the plurality of ML engine(s) 150. In one example, the implementation engine 156 is configured to operate the data retrieval engines 151 so that the data retrieval engine 151 retrieves data at the appropriate time to be able to route speech data to the language identification module (e.g., LID module(s) 152), the internal buffer 146, and/or one or more speech recognition engines 154.

The implementation engine 156 facilitates the process communication and timing of communication between one or more of the ML engine(s) 150 and is configured to implement and operate one or more of the ML engine(s) 150 which is configured to process speech data comprising spoken language utterances in multiple languages. The implementation engine 156 is instantiated within and/or accessed by the computing system 110 to operate the different ML engine(s) 150. In other instances, the implementation engine 156 is a remote process of a remote system that is used to remotely control components of the system 110, such as the other ML engine(s) 150.

The computing system is in communication with remote system(s) 120 comprising one or more processor(s) 122 and one or more computer-executable instruction(s) 124. The remote system(s) 120 can be controlled by third party entities. It is anticipated that, in some instances, the remote system(s) 120 further comprise databases housing data that can be used in speech processing, for example, audio data not stored in local storage. Additionally, or alternatively, the remote system(s) 120 include machine learning systems external to the computing system 110 that further support or augment the functionality of system 110. In some embodiments, the remote system(s) 120 are software programs or applications.

Attention will now be directed primarily to FIG. 2, which illustrates an exemplary process flow diagram for generating and storing speech transcriptions, with some references to corresponding components shown in FIG. 1. The computing system 110 as shown in FIG. 1 and/or controller 202 as shown in FIG. 2 is configured to obtain electronic content 141 comprising an audio stream 142A of spoken language utterances 143. The electronic content 141 can be obtained in real-time from an audio-visual or audio streaming device/application or can be obtained from previously recorded data (e.g., from remote systems 120).

To begin generating speech transcriptions, the system selects a language identification module 152A associated with a plurality of speech recognition (SR) engines (e.g., SR A 154A and SR B 154B) that are configured to analyze spoken language utterances included in the audio stream 142A and detect at least one language (e.g., Language A 148A and Language B 148B) corresponding to audio stream 142A comprising utterances 143.

The language identification module 152A is accessed and/or selected by various methods. The language identification module 152A is selectable based on user specified language preferences. For example, a user can pre-define certain language parameters or preferences based on each user's speaking abilities or a user can pre-define language preferences based on the speculated languages that will be spoken in the audio stream 142A by entering user input specifying/selecting preferences within a language transcription application interface (e.g., interface(s) 114).

The language identification module 152A is also automatically selectable from a plurality of language identification modules (e.g., LID module(s) 152) that is determined to be best fit or most appropriate LID module to use based on known parameters of the audio streams to be processed.

For instance, the computing system 110 accesses a language identification module database comprising a plurality of language identification modules where each language identification module included in the plurality of language identification modules corresponds to a particular language profile included in the database comprising language profiles 148. Based on one or more languages included in the subset of languages corresponding to the user-defined preferences or other automatically selected subset of languages, based on speaker profiles, type of audio stream or source of audio stream, program contexts, geographic locations, and so forth, the computing system selects a language identification module that is included in the language identification module database that appears to best match the language profiles of those identified speaker profiles, type of audio stream or source of audio stream, program contexts, geographic locations, and so forth.

The selected language identification module (e.g., LID module 152A) is also selectable by building an optimized language identification module in real-time. A language identification module component database comprises a plurality of language identification module components (e.g., LID components 149) where each language identification module component included in the plurality of language identification module components is configured to combine with one or more different language identification module components included in the plurality of language identification module components. When user input or other input is received that designates known and/or likely languages to be spoken in the audio stream(s), the system selects one or more language identification module components 149 specifically configured to recognize and analyze those languages and combines the selected one or more language identification module components 149 into a single language identification module (e.g., LID module 152A).

The language identification module 152A that is selected and/or built is then used to detect the language associated with the audio stream 142 that is being processed by the system in real-time. For example, at T1 of the audio stream 142, the language identification module 152A detects Language A 148A. At T2, the language identification module 152A detects Language B 148B, at which point it alerts the controller 202 that a new language has been detected (e.g., switch 210).

The computing system 110 selects a first or default speech recognition engine (e.g., SRA 154A) of the plurality of speech recognition engines 154. The first speech recognition engine is configured to transcribe spoken language utterances in a first language (e.g., Language A 148A). The default speech recognition engine is selectable by various methods. The first speech recognition engine (e.g., SR A 154A) is selectable based on a set of previous results output by the language identification module. The first speech recognition engine is also selectable based on user-defined settings, such as pre-defining a subset of languages or a user language preference.

Figure 6A:
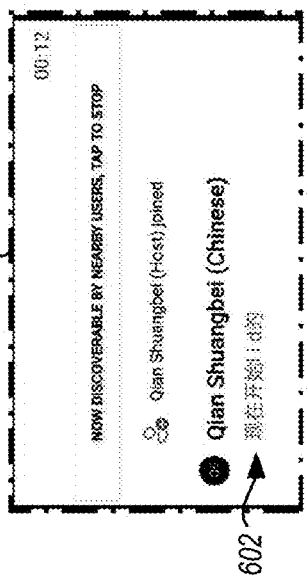
FIGS. 6A-6F illustrate various views of a user interface that is dynamically modified to display a plurality of transcriptions.
Figure 6B:
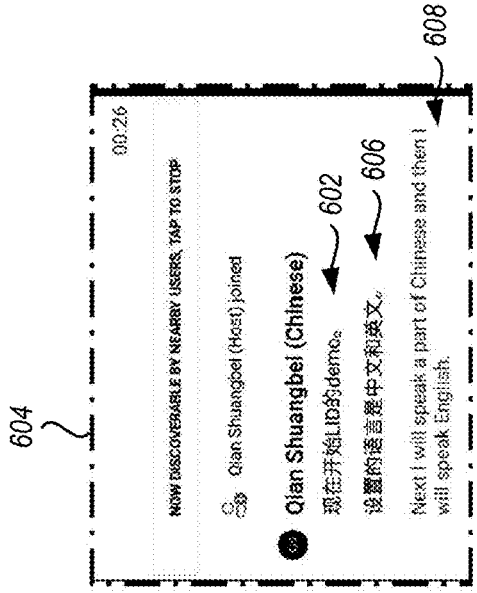

Speech recognition engines 154 are also configured to transcribe a spoken language utterance into a plurality of languages comprising a primary language and a secondary language corresponding to the spoken language utterance. For example, sometimes a speaker may speak multiple languages within the same spoken language utterance (see first generated speech transcription as shown in FIG. 6B) such that the selected speech recognition engine is configured to understand and transcribe at least two languages.

The audio stream 142A is simultaneously transmitted to the language identification module 152A, a currently selected speech recognition engine (e.g., SR A 154A), and the internal buffer 146. Alternatively, the audio stream 142A is routed to each of the aforementioned system locations in series.

The system generates a first real-time transcription (e.g., Transcript AT1 (RT) 144A) of the first portion (e.g., audio portion 204) of the audio stream 142A in the first language (e.g., Language A 148A) using the first speech recognition engine (e.g., SR A 154A). The speech recognition engines 154 are also configured to generate a timestamp (e.g., T1, T2, etc. . . . as shown in FIG. 2) for each portion of the audio stream that is transcribed by one or more speech recognition engines. The timestamps are generated in pre-defined intervals or based on the parsing of the audio stream based on speaker or identified spoken language utterance. The timestamps are used to mark and track temporal locations of the different portions or sub-portions of the audio stream and corresponding transcriptions.

After Transcript AT1 (RT) 144A is generated, it is stored in a transcription cache 147. Meanwhile, the system generates a second transcription (e.g., Transcript AT2 (RT) 144B of a second portion (e.g., Audio Portion 206) of the audio stream 142A in the first language (e.g., Language A 148A) using the first speech recognition engine (e.g., SR A 154A). The second transcription is also stored in the transcription cache 147.

Subsequent to and/or concurrently to generating the second transcription, the LID module 152A is used to determine that the second portion of the audio stream or that the temporal location T2 of the audio stream corresponds to a second language (e.g., Language B 148B). Once a new language is detected, the LID module 152A is configured to alert the controller 202 that the language has been switched (e.g., switch 210), at which point a new speech recognition engine (e.g., SR B 154B) is selected. Subsequently, the audio portion (e.g., audio portion 206) corresponding to the temporal location (e.g., T2) or portion of the audio stream that corresponds to the new language (e.g., Language B 148B) is sent to the new speech recognition module (e.g., SR B 154B) to generate a corrected transcription (e.g., Transcript BT2 (B) 145A) if that portion has already been transcribed (e.g., Transcript AT2 (RT) 144B) by a previous speech recognition module (e.g., SR A 154A).

Subsequent to determining that the second portion (e.g., Audio Portion 206) of the audio stream 142A corresponds to a second language (e.g., Language B 148B), the system (e.g., computing system 110) generates a third transcription which is a corrected transcription (e.g., Transcript BT2 (B) 145A) from the Audio Portion 206 stored in the internal buffer 147.

After the corrected transcription is generated, the system replaces and/or overwrites (e.g., overwrite arrow 212) the second transcription (e.g., Transcript AT2 (RT) 144B stored in the transcription cache 147) with the third transcription (e.g., Transcript BT2 (B) 145A) in the transcription cache 147.

The computing system 110 is also configured to access a language database comprising a plurality of language profiles 148 and select a subset of languages corresponding to one or more language profiles included in the language database.

The subset of languages corresponding to one or more language profiles included in the language database is automatically selectable based on attributes of the audio stream. The selection of the subset of languages is also based, in some alternative embodiments, on user-defined input entered into the user interface(s).

To select the subset of languages based on attributes of an audio stream, the computing systems identifies one or more attributes of spoken language utterances included in the electronic content and automatically selects the subset of languages corresponding to one or more language profiles included in the language database based on the one or more attributes of the spoken language utterances identified in the electronic content. In such instances, the computing system limits an analysis of the electronic content 141 by the LID module 152A to a detection of one or more languages included in the subset of languages. The computing system 110 then selects the one or more speech recognition engine (s) (e.g., SR A 154A and SR B 154B) associated with the LID module 152A that are determined by the LID module 152A to be most closely associated with the subset of languages.

In some embodiments, the computing system identifies the subset of languages based on the identify of a plurality of speakers corresponding to the audio stream. The system obtains a pre-defined set of languages for every speaker included in the plurality of speakers based on attributes identified in the audio stream or based on previously defined speaker preferences and limits an analysis of an audio stream by a language identification module to one or more languages included in a particular pre-defined set of languages when a particular speaker corresponding to the particular pre-defined set of languages is identified.

When multiple speakers are identified, the system is further configured to parse the different audio stream with the multiple speakers into isolated streams where each isolated stream corresponds to a discrete speaker of the multiple speakers. This is particularly beneficial if there are multiple speakers that are speaking at the same time causing spoken language utterances to overlap within the original audio stream. This parsing is performed, when necessary, by the LID Module(s) 152, data retrieval engine 151 or another component of the computing system 110.

Referring back to FIG. 2, the LID module 152A continues to analyze the audio stream in real-time and detects languages at subsequent temporal locations (e.g., T3 and T4). As shown in FIG. 2, the LID module 152A alerts the controller 202 that the same language has been detected (e.g., same 214 and same 216) such that a new speech recognition engine is not needed. For example, SR B 154B continues to transcribe the audio stream (e.g., Transcript BT3 (RT) 144C and Transcript BT4 (RT) 144D) after the corrected transcription (e.g., Transcript BT2 (B) 145A) is generated. Each subsequent real-time transcription is stored in the transcription cache 147.

Figure 3:
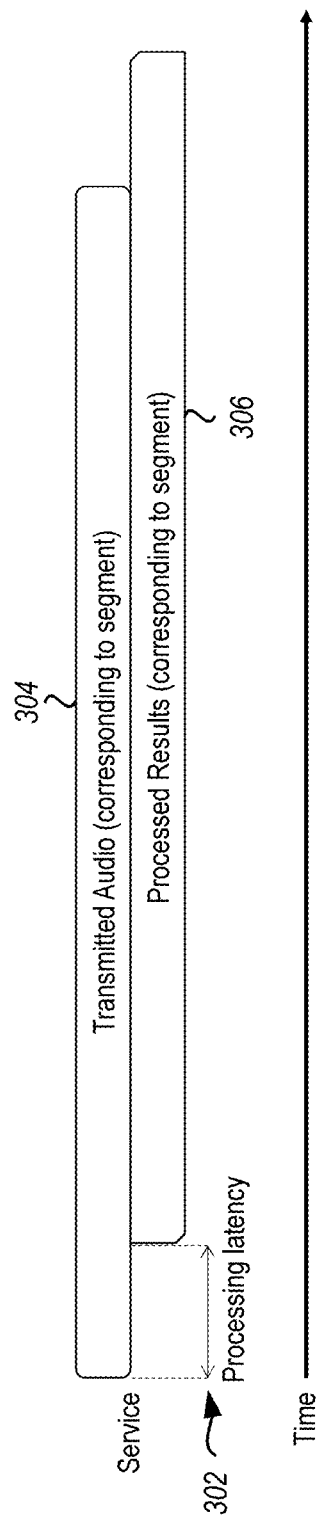
FIG. 3 illustrates an example embodiment of the processing latency between the transmitted audio and the processed results.

Attention will now be directed to FIG. 3, which illustrates the processing latency 302 incurred when the audio is streamed and transmitted in real time (e.g., Transmitted Audio 304) and is processed (i.e., transcribed). This shows that there is a slight delay between the real-time streaming and transmission of the audio stream and the generated transcriptions (e.g., Processed Results 306).

However, because the LID module(s) and speech recognition modules operate faster than real-time, the system can "catch up" or make up for the latency incurred during the re-transcription process, such that the system no longer needs to pull from the buffer but can begin directly transcribing the audio stream in real-time again.

Attention will now be directed to FIG. 4, which shows another exemplary embodiment for processing, generating and storing multi-lingual speech transcriptions, and specifically shows how the system can make up for the latency incurred during processing. For example, the speech recognition (SR) engine corresponding to English (e.g., SR (en-US) 402) is speculatively selected to begin transcribing an audio stream as soon as it receives the audio stream. The audio stream is also analyzed by the LID 404 after the audio stream is transmitted to the LID 404.

As shown, there can be a slight latency between the generation of the transcription of the audio portion by the speech recognition engine and the detection of the language at the various time intervals by the LID. Here, SR (en-US) 402 begins transcribing at T0 in real-time, but the LID 404 detects that audio portion at T0 corresponds to language for English at T2.

For example, an audio portion from T0 to T1 corresponds to a first language (e.g., English), but the English speech recognition engine (e.g., SR (en-US) 402) continues to assume that the rest of the audio stream is also in English and continues to transcribe the audio stream at T1, T2, and T3.

In this embodiment, the LID 404 does not detect that the audio stream corresponds to a second language (e.g., Chinese) until T4, but the temporal location where the new language is introduced is actually at T2 of the audio stream. This may occur for instance, when the LID 404 determines that certain phonemes could correspond to different languages, including (en-US) and (zh-CH), for instance. The LID 404 is configured to wait until a certain number of errors or non-matching phonemes are detected in the audio stream for a first identified language before determining that the spoken language in the audio stream has switched to a new language.

Thus, the transcriptions output by SR (en-US) 402 at T2 and T3 are incorrect and need to be overwritten. The system then retrieves audio portions at T2 and T3 from the internal buffer (e.g., internal buffer 147 of FIGS. 1 and 2) and transmits them to SR (zh-CN) 406, which then generates a corrected transcript. The system is configured to go back to T2, for example, or another earlier portion in the audio stream when the first errors or non-matching phonemes for a previous language were detected. Alternatively, the system is configured to go back a predetermined duration into the audio stream, (e.g., a predetermined duration of time like 2 seconds, 3 seconds, 4 seconds, or another time duration) or a predetermined quantity of phonemes (e.g., 5 phonemes, 10 phonemes, 15 phonemes, or another quantity of phonemes), or a predetermine quantity of phrases, sentences, or words. A latency will be created when the system goes back to T2 in order to correct the transcript for the selected duration of the previously transcribed audio stream. Here, the latency is caught up, because the speech recognition engine is able to transcribe the audio portions retrieved from the internal buffer at a rate faster than real-time speech, e.g., faster than the speakers are speaking. At T4, the system is able to generate the corrected transcription for T2 and T3 and starts transcribing the audio stream with SR (zh-CN) 406 in real time at T4.

It should be appreciated that only one speech recognition engine is active at a time during processing, during the majority of the transcription and related processing time, thereby saving processing power. However, multiple speech recognition systems will be active during language switches, as described. While the speech recognition results after the language switches have added latency from the LID processing time, it is possible to mitigate this latency by exploiting a "catch up" gain from the buffered audio stream. This may result in reducing the amount of buffered audio. But, the buffering can be built up by omitting gaps in speaking from the buffered audio in the future buffering processes.

Figure 5:
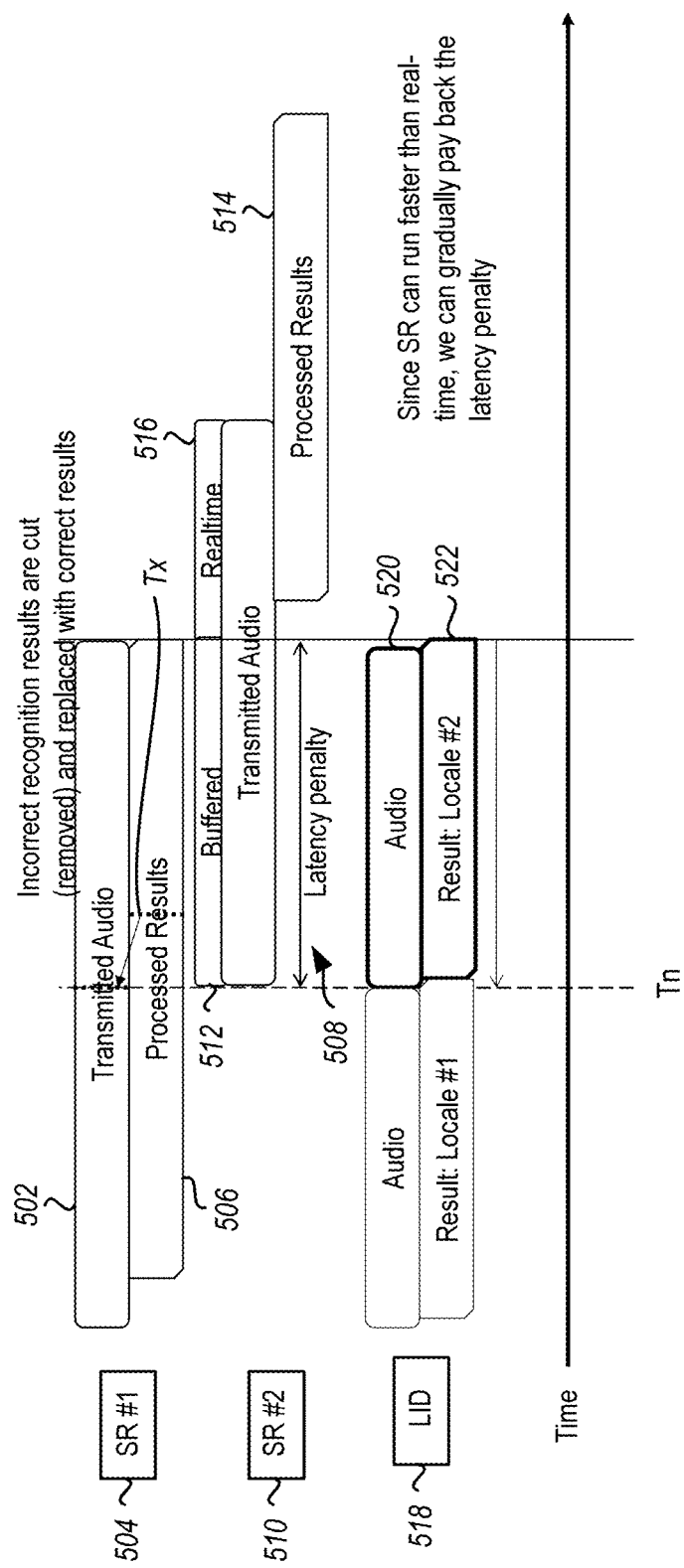
FIG. 5 illustrates an example embodiment for processing multi-lingual audio and outputting final transcriptions.

Attention will now be directed to FIG. 5 which illustrates an example embodiment for continuously generating and correcting speech transcriptions. As shown in FIG. 5, the system obtains electronic content comprising an audio stream of spoken language utterances. This audio stream is transmitted to SR #1 (e.g., transmitted audio 502). The transmitted audio 502 is processed by the speech recognition engine (e.g., SR #1 504) and the processed results 506 comprise near-real time transcriptions of the audio stream. There is a slight latency (e.g., latency penalty 508) incurred in the processing and generating of the transcriptions. However, this latency is made up further downstream in the processing. It should be noted that while the audio stream is transmitted to the speech recognition engine, the audio stream is also continuously stored in an internal buffer.

The processed results 506 (e.g., the real-time transcription of the audio stream in the first language) are also continuously stored in a transcription cache. The audio stream is also analyzed by a selected language identification module that is configured to continuously analyze the audio stream and detect languages corresponding to spoken language utterances. It should be appreciated that prior to or concurrently with continuously storing the audio stream in the internal buffer, the system selects the language identification module configured to continuously analyze the audio stream and detect languages corresponding to spoken language utterances.

While generating the real-time transcription of the audio stream in the first language, the system uses the language identification module (LID 518) to detect that a new spoken utterance starting at a subsequent temporal location (Tn) in the audio stream (e.g., audio portion 520) corresponds to a second language (e.g., Result: Locale #2 522, whereas the first Locale #1 corresponds to the first language).

After detecting that the new spoken utterance in the audio stream corresponds to the second language, the system selects a second speech recognition engine (SR #2 510) configured to transcribe spoken language utterances in the second language.

Notably, the initial detection of the new spoken language utterance at time Tx, during processing, may occur subsequent to the actual presentation of the utterance in the audio stream at time Tn. This delay results from the processing of the audio and is one reason to buffer the audio stream. Accordingly, when this situation occurs (e.g., detecting an utterance spoken in a new language), the system retrieves a buffered portion 512 of the audio stream from the internal buffer. The buffered portion 512 that is selected will start in the audio stream at the relative temporal location (Tn) where the new language was first detected (Tx) in the processed audio stream. Then, the system will start to use the new speech recognition engine (SR #2 510) to continue processing of the selected buffered portion 512 and the resuming ongoing audio stream being processed, until any subsequent switch over.

During a switch over in speech recognition engines being used, the system will continue processing the audio stream with the previous and incorrect first speech recognition engine, until the switch is fully completed.

Subsequent to selecting the second or other subsequent speech recognition engine and retrieving the buffered portion of the audio stream, the system generates a new transcription (e.g., processed results 514) of the buffered portion 512 of the audio stream in the second language using the second speech recognition engine SR #2 510. The incorrect recognition results (which were processed by the first speech recognition engine before the handoff was completed) are removed from the transcription cache and replaced with the correct results.

Additionally, if results are being displayed and previous transcription results were displayed from the first speech recognition engine that are incorrect, the system replaces the incorrect results on the display interface with new corrected results generated from the second speech recognition engine.

As shown in FIG. 5, SR #2 may process the buffered audio at a rate faster than is possible with real-time processing, meaning that the system can process greater quantities of buffered audio in a same time or shorter time than it takes to process real-time audio that is not buffered, since the real-time audio is delivered at a rate of the speaker(s), which is slower than the processing capabilities of the computing system. This is particularly true when the correct speech recognition engine is selected for processing the corresponding language, so that the system is able to process the transmitted audio stream with the correct speech recognition engine at a faster rate than real-time audio delivery, enabling the system to catch up to the real-time audio delivery and to thereby provide essentially real-time audio transcriptions for the audio stream (e.g., real-time audio portion 516). These processed results 514 are then continuously stored in the transcription cache.

Attention will now be directed to FIGS. 6A-6D which illustrate various view of a user interface (e.g., user interfaces 114) which are configured to display speech transcriptions generated by the systems and methods described herein. The system is configured to obtain electronic content comprising an audio stream of multi-lingual spoken language utterances and dynamically generate a first real-time transcription of a first portion of the audio stream in a first language (e.g., Chinese) using a first speech recognition engine configured to transcribe spoken language utterances in the first language.

Figure 6C:
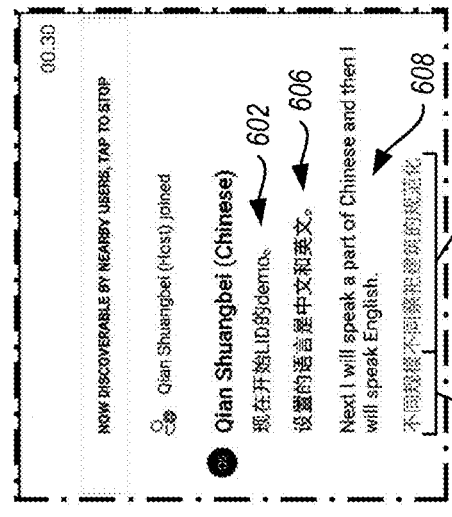

The system also dynamically modifies a user interface to display the first real-time transcription (e.g., transcription 602) of the audio stream in the first language within a user interface 604 at a first location. The system continues to dynamically update the user interface 604 to display the real-time speech transcriptions as the speaker is speaking (see transcription 606 as shown in FIG. 6B). The system is able to display transcriptions in different languages based on the language switches identified by an LID module. See transcription 608 as shown in FIG. 6C.

Figure 6D:
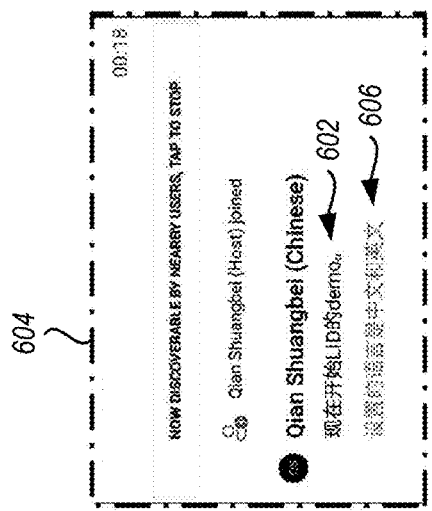
Figure 6E:
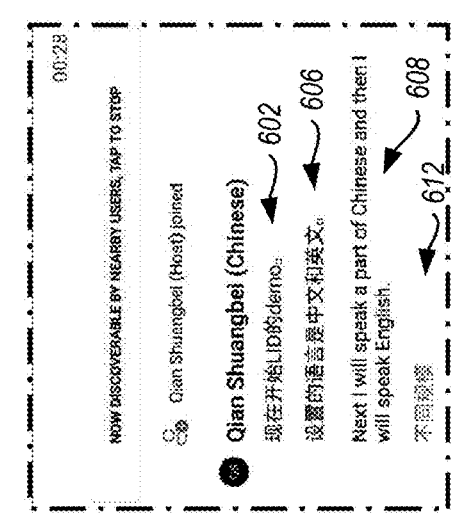

The system is also configured to identify a sub-portion of the first real-time transcription of the audio stream that comprises one or more incorrectly transcribed spoken language utterances (e.g., "put hungry more" 610 as shown in FIG. 6D) which has been transcribed in the incorrect language. The system then generates a corrected transcription of a sub-portion of the audio stream that corresponds to the sub-portion of the first real-time transcription that comprises one or more incorrectly transcribed spoken language utterances and modifies the user interface 604 to further display the corrected transcription (see transcription 612 as shown in FIG. 6E) of the audio stream in a second language within the user interface by replacing the sub-portion of the first real-time transcription of the audio stream that comprises one or more incorrectly transcribed spoken language utterances with the corrected transcription of the audio stream.

Figure 6F:
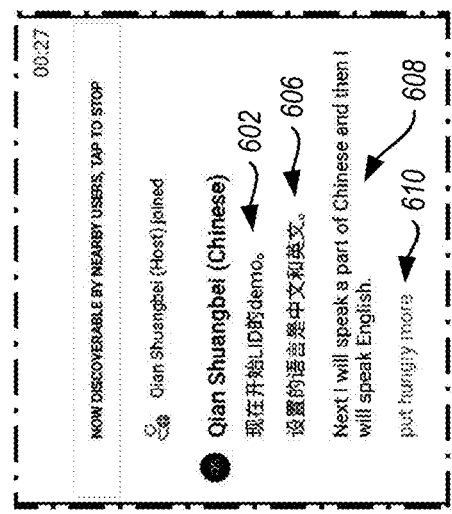

Subsequent to correcting the incorrectly transcribed and displayed portion of the audio stream, the system generates a second real-time transcription of a second portion of the audio stream in the second language using a second speech recognition engine configured to transcribe spoken language utterances in a second language and dynamically modifies the user interface 604 to display the second real-time transcription (see transcription 614 as shown in FIG. 6F) of the audio stream in the second language within the user interface.

Figure 7:
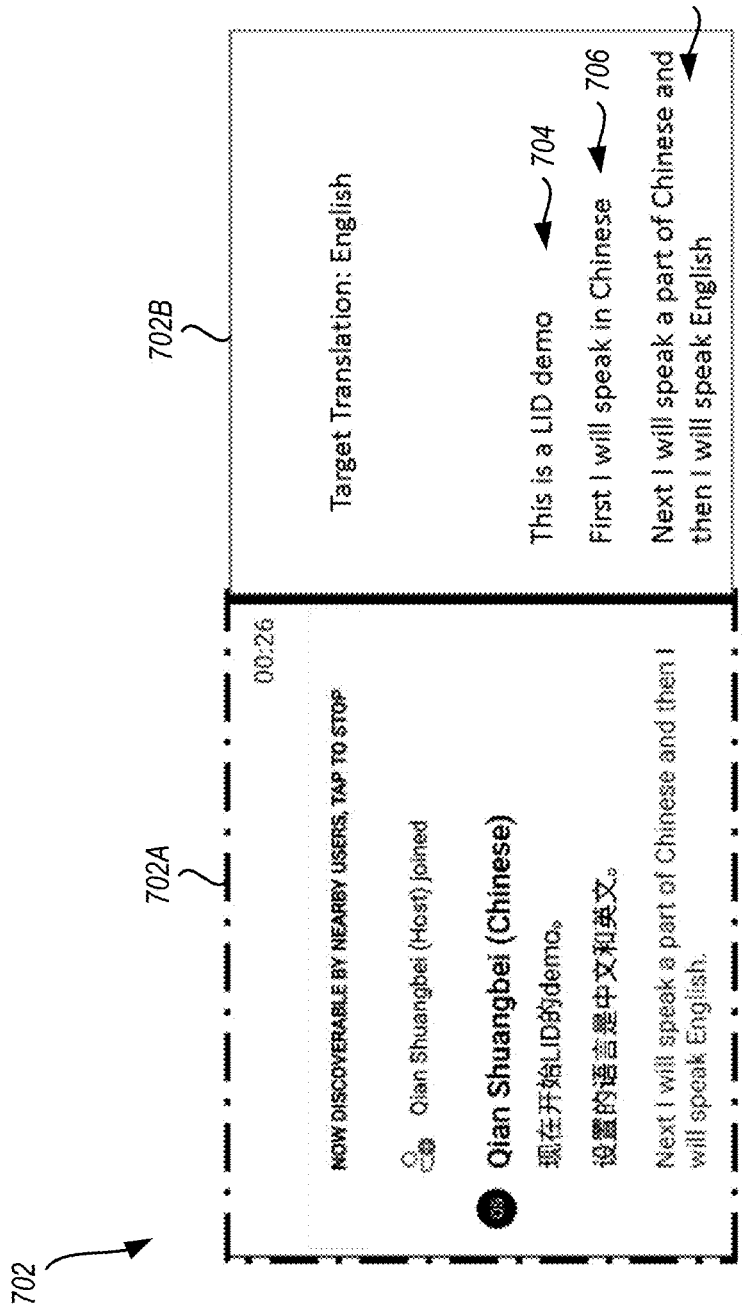
FIG. 7 illustrates another embodiment of the user interface.

Attention will now be directed to FIG. 7, which illustrates a user interface 702A comprising a plurality of real-time and corrected transcriptions in multiple languages, as well a user interface 702B that displays a plurality of translated transcriptions (transcription 704, transcription 706, and transcription 708, in a target language (e.g., English). Thus, the system is also configured to generate a third transcription of the audio stream that is a translation of the first real-time transcription and/or second real-time transcription in a target language and modify the user interface 702 to display the third transcription within the user interface at a second location of the user interface 702B.

The system is also configured to generate a plurality of timestamps that correspond to a plurality of transcription segments of the audio stream and dynamically modify the user interface to display the plurality of timestamps within the user interface, each timestamp of the plurality of timestamps displayed in a location proximate to a particular transcription segment of the plurality of transcription segments.

Figure 8:
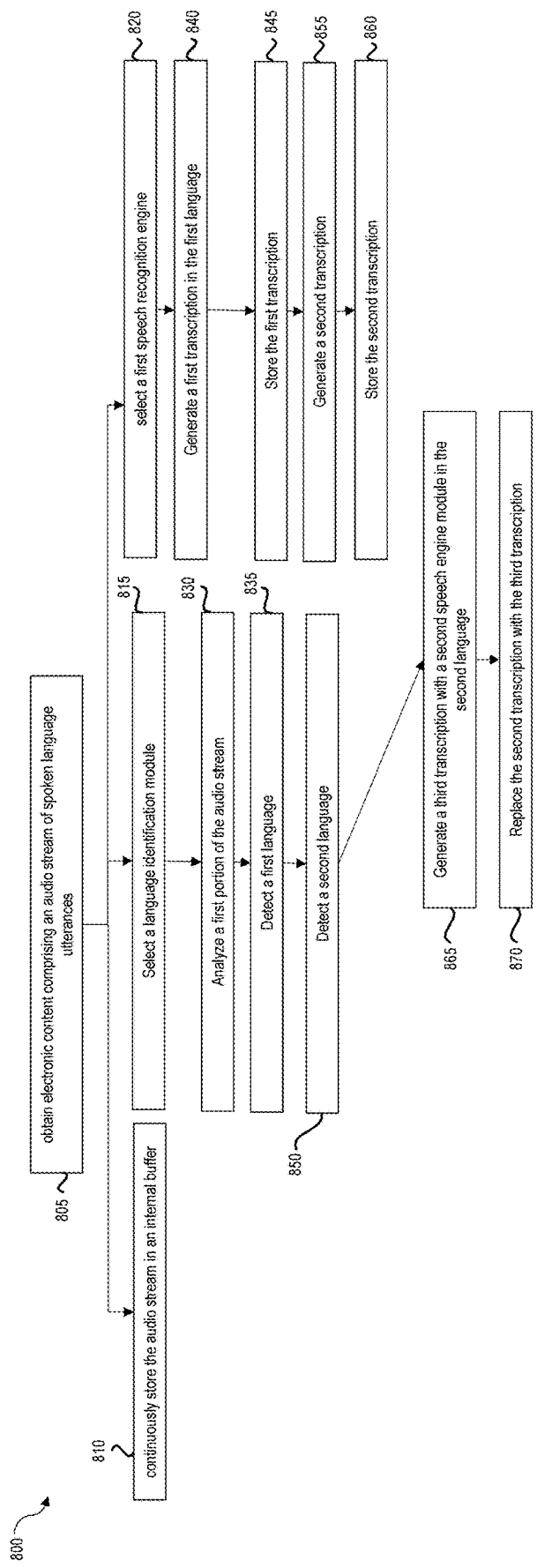
FIG. 8 illustrates another embodiment of a flow diagram having a plurality of acts for generating and correcting multi-lingual speech transcriptions.

Attention will now be directed to FIG. 8 which illustrates a flow diagram 800 that includes various acts (act 805, act 810, act 815, act 820, act 825, act 830, act 840, act 845, act 850, act 855, and act 860) associated with exemplary methods that can be implemented by computing system 110 for generating and correcting multi-lingual speech transcriptions.

The first illustrated act includes an act of obtaining a obtain electronic content comprising an audio stream of spoken language utterances (act 805). This audio stream can be accessed from and/or continuously stored in an internal buffer (act 810). A language identification module and speech recognition engine associated with the audio stream and spoken languages of the audio stream are selected (acts 815 and 820, respectively).

The computing system selects the language identification module (act 815) associated with a plurality of speech recognition engines that is configured to analyze spoken language utterances and to detect at least one language corresponding to audio stream of spoken language utterances (act 835). A first portion of the audio stream is analyzed using the language identification module (act 830) and a first language that corresponds to the first portion of the audio stream is detected using the language identification module (act 835).

A first speech recognition engine is selected from the plurality of speech recognition engines (act 820) by the language identification module and/or based on user input. The first speech recognition engine generates a first transcription of the first portion of the audio stream in the first language (act 840).

The computing then stores the first transcription in a transcription cache (act 845), generates a second transcription of a second portion of the audio stream in the first language using the first speech recognition engine (act 855), and stores the second transcription in the transcription cache (act 860).

Subsequent to and/or concurrently to generating the second transcription, the language identification module is also used to determine that the second portion of the audio stream corresponds to a second language (act 850).

Then, subsequent to determining that the second portion of the audio stream corresponds to a second language, a third transcription in the second language using a second speech recognition engine configured to transcribe spoken language utterances in the second language is generated (act 865) and the second transcription is replaced with the third transcription in the transcription cache (act 870). Alternatively, the system bypasses acts 865 and 870, by dynamically generating the second transcription (act 855) in the second language with the second speech recognition engine. This embodiment is enabled when the second speech recognition engine is selected concurrently with the act 850 of detecting the second language.

Figure 9:
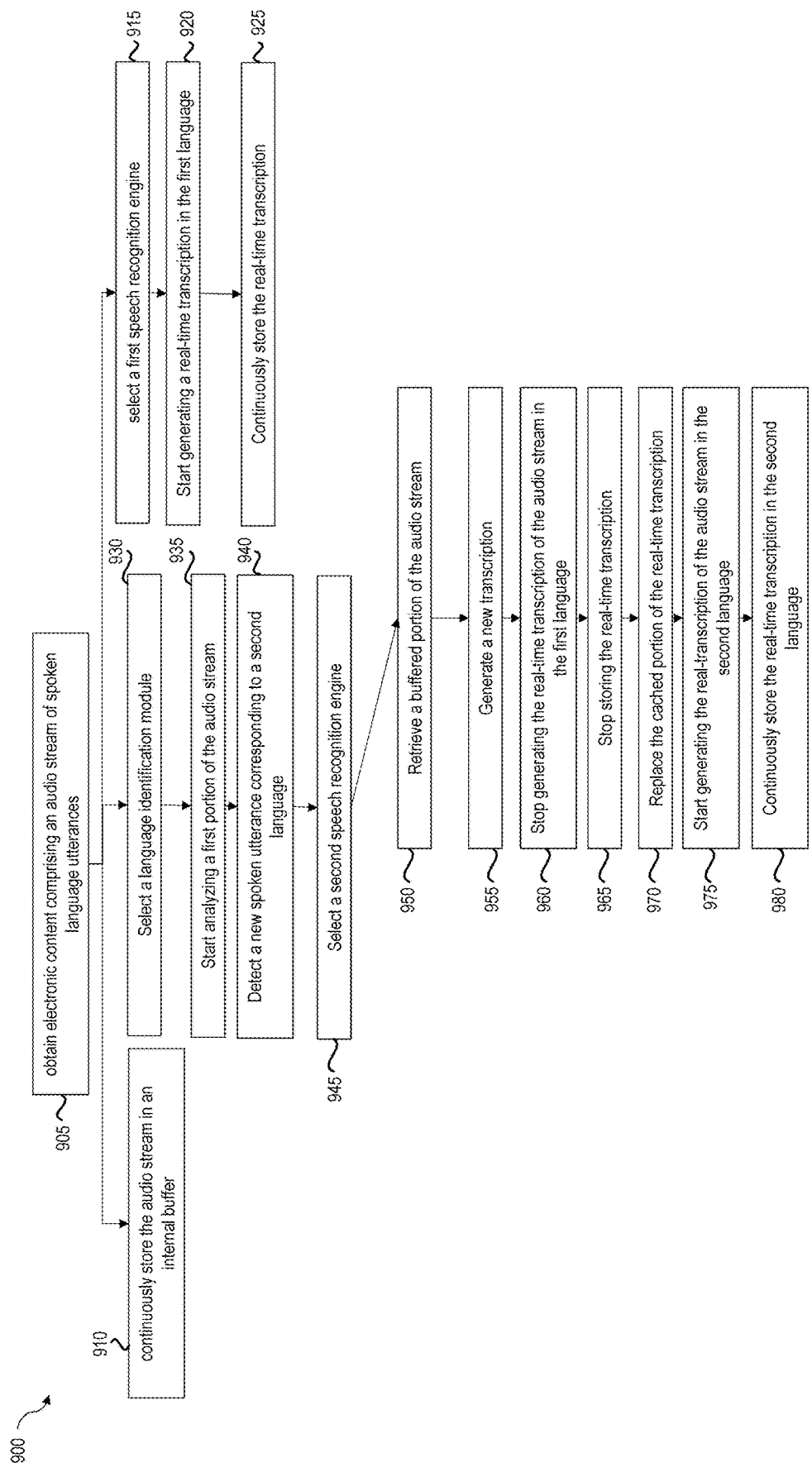
FIG. 9 illustrates another embodiment of a flow diagram having a plurality of acts for generating and correcting multi-lingual speech transcriptions.

Attention will now be directed to FIG. 9 which illustrates a flow diagram 900 that includes various acts associated with exemplary methods that can be implemented by computing system 110 for generating and correcting multilingual speech transcriptions.

The first illustrated act includes an act of obtaining a obtain electronic content comprising an audio stream of spoken language utterances (act 905). The computing system continuously stores the audio stream in an internal buffer (act 910 and selects a first speech recognition engine configured to transcribe spoken language utterances in a first language (act 915). Subsequent to selecting the first speech recognition engine, the first speech recognition engine starts generating a real-time transcription of the audio stream in the first language using the first speech recognition engine starting at a first temporal location of the audio stream (act 920). The computing system also continuously stores the real-time transcription of the audio stream in the first language in a transcription cache (act 925).

A language identification module configured to continuously analyze the audio stream and detect languages corresponding to spoken language utterances is also selected by the system automatically based on predetermined settings, or profiles or contexts of the audio stream and/or based on user input (act 930).

Subsequent to selecting the language identification module and obtaining the audio stream, the language identification modules is used to start analyzing the audio stream starting at the first temporal location (act 935). While generating the real-time transcription of the audio stream in the first language, language identification module is used to detect that a new spoken utterance starting at a subsequent temporal location in the audio stream corresponds to a second language (act 940).

Subsequent to detecting that the new spoken utterance in the audio stream corresponds to the second language, the computing system selects a second speech recognition engine configured to transcribe spoken language utterances in the second language (act 945) and retrieves a buffered portion of the audio stream from the internal buffer, the buffered portion starting at the subsequent temporal location (act 950). In some instances, the language identification module is used to select the speech recognition engines based on a determined correspondence between the detected languages and the known and mapped capabilities of the speech recognition engines, according to a mapping of correspondence stored by or accessible by the system.

Subsequent to and/or concurrently to selecting the second speech recognition engine and retrieving the buffered portion of the audio stream, a new transcription of the buffered portion of the audio stream in the second language is generated using the second speech recognition engine (act 955). The computing system also stops generating the real-time transcription of the audio stream in the first language using the first speech recognition engine (act 960) and stops storing the real-time transcription of the audio stream in the first language in the transcription cache (act 965).

A cached portion of the real-time transcription of the audio stream is replaced with the new transcription of the buffered portion, the cached portion starting at the subsequent temporal location (act 970). The computing system then starts generating the real-time transcription of the audio stream in the second language using the second speech recognition engine (act 975) and continuously stores the real-time transcription of the audio stream in the second language in the transcription cache (act 980).

It will be appreciated that the acts referenced in the flow diagram 900 of FIG. 9 can be recursively performed, so as to support the processing of an audio stream having any number of detected languages and any quantity of switches between the languages used in the audio stream. Accordingly, the system may effectively and dynamically select and switch the speech recognition engines that are used to transcribe the different languages that are detected, dynamically switching between the different speech recognition engines that are used for each of the different corresponding detected language switches in the audio stream, also replacing any portions of incorrectly transcribed audio segments associated with the different switches that may have been incorrectly transcribed before and/or during the processes of making the switch(es) between the different speech recognition engine(s).

Figure 10:
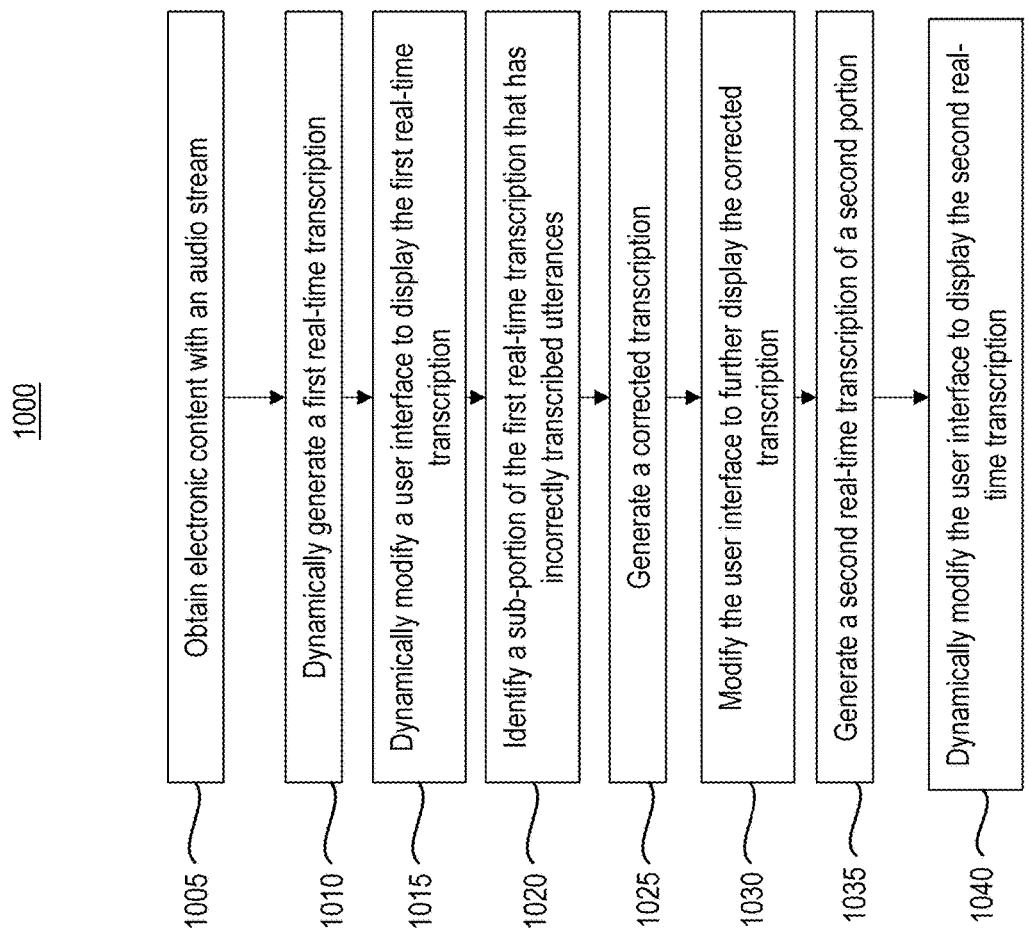
FIG. 10 illustrates another embodiment of a flow diagram having a plurality of acts for generating, correcting, and displaying multi-lingual speech transcriptions.

Attention will now be directed to FIG. 10 which illustrates a flow diagram 1000 that includes various acts associated with exemplary methods that can be implemented by computing system 110 for generating and correcting multi-lingual speech transcriptions. The first illustrated act includes an act of obtaining a obtain electronic content comprising an audio stream of spoken language utterances (act 1005).

The computing system then dynamically generates a first real-time transcription of a first portion of the audio stream in a first language using a first speech recognition engine configured to transcribe spoken language utterances in the first language (act 1010). The computing system also dynamically modifies a user interface to display the first real-time transcription of the audio stream in the first language within a user interface at a first location (act 1015). A sub-portion of the first real-time transcription of the audio stream that comprises one or more incorrectly transcribed spoken language utterances is identified (act 1020). Subsequently, a corrected transcription of a sub-portion of the audio stream that corresponds to the sub-portion of the first real-time transcription that comprises one or more incorrectly transcribed spoken language utterances is generated (act 1025).

The computing system then modifies the user interface to further display the corrected transcription of the audio stream in a second language within the user interface by replacing the sub-portion of the first real-time transcription of the audio stream that comprises one or more incorrectly transcribed spoken language utterances with the corrected transcription of the audio stream (act 1030).

A second real-time transcription of a second portion of the audio stream in the second language is generated using a second speech recognition engine configured to transcribe spoken language utterances in a second language (act 1035). Finally, the computing system dynamically modifies the user interface to display the second real-time transcription of the audio stream in the second language within the user interface. (act 1040).

In view of the foregoing, it will be appreciated that the disclosed embodiments provide many technical benefits over conventional systems and methods for generating and correcting multi-lingual speech transcriptions.

Embodiments of the present invention may comprise or utilize a special purpose or general-purpose computer (e.g., computing system 110) including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media (e.g., hardware storage device(s) 140 of FIG. 1) that store computer-executable instructions (e.g., computer-executable instructions 118 of FIG. 1) are physical hardware storage media or storage devices that exclude transmission media. Computer-readable media that carry computer-executable instructions or computer-readable instructions (e.g., computer-executable instructions 118) in one or more carrier waves or signals are transmission media. Thus, by way of example, and not limitation, embodiments of the invention can comprise at least two distinctly different kinds of computer-readable media: physical computer-readable storage media or storage devices and transmission computer-readable media.

Physical computer-readable storage media and storage devices are hardware and include RAM, ROM, EEPROM, CD-ROM or other optical disk storage (such as CDs, DVDs, etc.), magnetic disk storage or other magnetic storage devices, or any other hardware which can be used to store desired program code means in the form of computer-executable instructions or data structures and which can be accessed by a general purpose or special purpose computer.

A "network" (e.g., network 130 of FIG. 1) is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry, or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
   one or more processors; and
   one or more hardware storage devices that store computer-readable instructions that are executable by the one or more processors to configure the computing system to:
   start a first transcription of at least a first portion of an audio stream of spoken language utterances in a first language with a first speech recognition model trained to transcribe spoken language utterances in the first language;
   subsequently, generate a second transcription of a second portion of the audio stream in the first language using the first speech recognition model such that the first language is used as a basis for generation of the second transcription;
   store the second transcription in a transcription cache;
   while generating the second transcription using the first speech recognition model, use a language identification module to detect that the second portion of the audio stream corresponds to a second language, wherein detecting that the second portion corresponds to the second language is based on a detection of a certain number of language errors or non-matching phonemes in the second transcription when the first language is used as the basis for the generation of the second transcription;
   based on detecting that the second portion of the audio stream corresponds to the second language, select a second speech recognition model trained to transcribe spoken language utterances in the second language;
   generate a third transcription of the second portion of the audio stream in the second language using the second speech recognition model trained to transcribe spoken language utterances in the second language, wherein the third transcription starts at a first timestamp within the audio stream, the first timestamp being earlier relative to a second timestamp that is indicative of when the certain number of language errors or non-matching phonemes is detected, and wherein the first timestamp has at least one of the following characteristics: the first timestamp is selected to be a predetermined amount of time before the second timestamp, the first timestamp is selected to be a predetermined quantity of phonemes before the second timestamp, or the first timestamp is selected to be a predetermined quantity of phrases, sentences, or words before the second timestamp; and
   automatically replace the second transcription with the third transcription in the transcription cache.

2. The computing system of claim 1, the one or more computer-readable instructions being further executable to further configure the computing system to:
   store the second portion of the audio stream in an internal buffer;
   after the second language is detected by the language identification module,
   retrieve the second portion of the audio stream;
   terminate the first speech recognition model; and
   access the second speech recognition model.

3. The computing system of claim 1, the one or more computer-readable instructions being further executable to further configure the computing system to:
   obtain electronic content comprising the audio stream;
   select the language identification module, the language identification module being associated with a plurality of speech recognition models and configured to analyze spoken language utterances and to detect at least one language corresponding to audio stream of spoken language utterances;

analyze the first portion of the audio stream using the language identification module;

detect that the first language corresponds to the first portion of the audio stream using the language identification module;

select the first speech recognition model of the plurality of speech recognition models, the first speech recognition model being configured to transcribe spoken language utterances in the first language;

generate a first transcription of the first portion of the audio stream in the first language using the first speech recognition model;

store the first transcription in the transcription cache.

4. The computing system of claim 3, the one or more computer-readable instructions being further executable to further configure the computing system to:

select the first speech recognition model based on a set of previous results output by the language identification module.

5. The computing system of claim 3, the one or more computer-readable instructions being further executable to further configure the computing system to:

select the language identification module based on user specified language preferences.

6. The computing system of claim 1, the one or more computer-readable instructions being further executable to further configure the computing system to:

access a language database comprising a plurality of language profiles; and select a subset of languages corresponding to one or more language profiles included in the language database.

7. The computing system of claim 6, the one or more computer-readable instructions being further executable to further configure the computing system to:

select the subset of languages corresponding to one or more language profiles included in the language database based on user-defined input.

8. The computing system of claim 6, the one or more computer-readable instructions being further executable to further configure the computing system to:

identify one or more attributes of spoken language utterances included in the electronic content; and automatically select the subset of languages corresponding to one or more language profiles included in the language database based on the one or more attributes of the spoken language utterances identified in the electronic content.

9. The computing system of claim 6, the one or more computer-readable instructions being further executable to further configure the computing system to:

limit an analysis of the electronic content by the language identification module to a detection of one or more languages included in the subset of languages.

10. The computing system of claim 6, the one or more computer-readable instructions being further executable to further configure the computing system to:

select each of the first and the second speech recognition models based on at least one language included in the subset of languages.

11. The computing system of claim 6, the one or more computer-readable instructions being further executable to further configure the computing system to:

access a language identification module database comprising a plurality of language identification modules, each language identification module included in the plurality of language identification modules corresponding to a particular language profile included in the language database; and based on one or more languages included in the subset of languages, select the language identification module that is included in the language identification module database.

12. The computing system of claim 6, the one or more computer-readable instructions being further executable to further configure the computing system to:

access a language identification module component database comprising a plurality of language identification module components, each language identification module component included in the plurality of language identification module components being configured to combine with one or more different language identification module components included in the plurality of language identification module components;

based on one or more languages included in the subset of languages, select one or more language identification module components; and combine the one or more language identification module components to form the language identification module.

13. The computing system of claim 1, the first speech recognition model being configured to transcribe a spoken language utterance in a plurality of languages comprising a primary language and a secondary language corresponding to the spoken language utterance.

14. The computing system of claim 1, the one or more computer-readable instructions being further executable to further configure the computing system to:

generate a timestamp for each portion of the audio stream that is transcribed by the first and second speech recognition models.

15. A computing system comprising:

one or more processors; and one or more hardware storage devices that store computer-readable instructions that are executable by the one or more processors to configure the computing system to:

obtain electronic content comprising an audio stream of spoken language utterances;

continuously store the audio stream in an internal buffer;

select a first speech recognition model configured to transcribe spoken language utterances in a first language;

subsequent to selecting the first speech recognition model, start generating a real-time transcription of the audio stream in the first language using the first speech recognition model starting at a first temporal location of the audio stream such that the first language is used as a basis for generation of the real-time transcription;

continuously store the real-time transcription of the audio stream in the first language in a transcription cache;

select a language identification module configured to continuously analyze the audio stream and detect languages corresponding to spoken language utterances;

subsequent to selecting the language identification module and obtaining the audio stream, start analyzing the audio stream using the language identification module starting at the first temporal location;

while generating the real-time transcription of the audio stream in the first language, use the language identification module to detect that a new spoken utterance, which starts at a subsequent temporal location in the audio stream, corresponds to a second language, wherein detecting that the new spoken utterance corresponds to the second language is based on a detection of a certain number of language errors or non-matching phonemes in the real-time transcription when the first language is used as the basis for the generation of the real-time transcription;

based on detecting that the new spoken utterance in the audio stream corresponds to the second language, select a second speech recognition model configured to transcribe spoken language utterances in the second language;

retrieve a buffered portion of the audio stream from the internal buffer, the buffered portion starting at the subsequent temporal location;

subsequent to selecting the second speech recognition model and retrieving the buffered portion of the audio stream, generate a new transcription of the buffered portion of the audio stream in the second language using the second speech recognition model, wherein the new transcription starts at a first timestamp within the audio stream, the first timestamp being earlier relative to a second timestamp that is indicative of when the certain number of language errors or non-matching phonemes is detected, and wherein the first timestamp has at least one of the following characteristics: the first timestamp is selected to be a predetermined amount of time before the second timestamp, the first timestamp is selected to be a predetermined quantity of phonemes before the second timestamp, or the first timestamp is selected to be a predetermined quantity of phrases, sentences, or words before the second timestamp;

stop generating the real-time transcription of the audio stream in the first language using the first speech recognition model;

stop storing the real-time transcription of the audio stream in the first language in the transcription cache;

automatically replace a cached portion of the real-time transcription of the audio stream with the new transcription of the buffered portion, the cached portion starting at the subsequent temporal location;

start generating the real-time transcription of the audio stream in the second language using the second speech recognition model; and continuously store the real-time transcription of the audio stream in the second language in the transcription cache.

16. The computing system of claim 15, the one or more computer-readable instructions being further executable to further configure the computing system to:

prior to or concurrently with continuously storing the audio stream in the internal buffer, select a language identification module configured to continuously analyze the audio stream and detect languages corresponding to spoken language utterances.

17. The computing system of claim 15, the one or more computer-readable instructions being further executable to further configure the computing system to:

identify a plurality of speakers corresponding to the audio stream;

obtain a pre-defined set of languages for every speaker included in the plurality of speakers; and limit an analysis of the audio stream by the language identification module to one or more languages included in a particular pre-defined set of languages when a particular speaker corresponding to the particular pre-defined set of languages is identified.

* * * * *